US011355260B2

(12) United States Patent
Hagstrand et al.

(10) Patent No.: US 11,355,260 B2
(45) Date of Patent: *Jun. 7, 2022

(54) LOW MFR POLYMER COMPOSITION, POWER CABLE INSULATION AND POWER CABLE

(71) Applicant: BOREALIS AG, Vienna (AT)

(72) Inventors: Per-Ola Hagstrand, Stenungsund (SE); Villgot Englund, Gothenburg (SE); Annika Smedberg, Myggenäs (SE)

(73) Assignee: BOREALIS AG, Vienna (AT)

(*) Notice: Subject to any disclaimer, the term of this patent is extended or adjusted under 35 U.S.C. 154(b) by 292 days.

This patent is subject to a terminal disclaimer.

(21) Appl. No.: 15/105,235

(22) PCT Filed: Aug. 19, 2014

(86) PCT No.: PCT/EP2014/067630
§ 371 (c)(1),
(2) Date: Jun. 16, 2016

(87) PCT Pub. No.: WO2015/090641
PCT Pub. Date: Jun. 25, 2015

(65) Prior Publication Data
US 2016/0329124 A1 Nov. 10, 2016

(30) Foreign Application Priority Data

Dec. 19, 2013 (EP) .................................. 13198410

(51) Int. Cl.
H01B 3/44 (2006.01)
C08K 5/14 (2006.01)
C08K 5/375 (2006.01)
C08F 255/02 (2006.01)
C08K 5/01 (2006.01)
H01B 9/00 (2006.01)

(52) U.S. Cl.
CPC .......... H01B 3/441 (2013.01); C08F 255/02 (2013.01); C08K 5/01 (2013.01); C08K 5/14 (2013.01); C08K 5/375 (2013.01); H01B 9/00 (2013.01); C08F 2500/02 (2013.01); C08F 2500/12 (2013.01); C08F 2500/18 (2013.01); C08F 2810/20 (2013.01); C08L 2203/202 (2013.01); C08L 2207/066 (2013.01)

(58) Field of Classification Search
CPC ..... H01B 9/00; H01B 3/441; C08L 2203/202; C08L 2207/066; C08F 255/02; C08F 2810/20; C08F 2500/02; C08F 2500/12; C08F 2500/18; C08F 2/38; C08F 210/02; C08K 5/01; C08K 5/14; C08K 5/005
USPC ....................................................... 428/375
See application file for complete search history.

(56) References Cited

U.S. PATENT DOCUMENTS

| 3,401,020 A | 9/1968 | Kester et al. | |
| 3,922,335 A | 11/1975 | Jordan et al. | |
| 4,340,577 A | 7/1982 | Sugawara et al. | |
| 4,391,789 A | 7/1983 | Estopinal | |
| 6,180,706 B1 | 1/2001 | Keogh | |
| 2002/0177638 A1* | 11/2002 | Sakurai | C08K 5/14 524/91 |
| 2009/0247678 A1* | 10/2009 | Lee | C08L 23/06 524/287 |
| 2010/0036031 A1* | 2/2010 | Herbst | C08K 5/00 524/331 |
| 2012/0305284 A1* | 12/2012 | Nilsson | C08F 10/02 174/110 SR |
| 2013/0000947 A1* | 1/2013 | Smedberg | C08F 210/02 174/110 SR |
| 2013/0081854 A1† | 4/2013 | Englund | |
| 2013/0284486 A1† | 10/2013 | Nilsson | |

(Continued)

FOREIGN PATENT DOCUMENTS

EP 629222 12/1994
EP 1695992 8/2006

(Continued)

OTHER PUBLICATIONS

Sigma-Aldrich catalog entry for CAS # 96-69-5 (Year: 2018).*
Sigma-Aldrich catalog entry for CAS No. 96-69-5 (Year: 2018).*
European International Search Report for PCT/EP2014/067628, dated Oct. 2, 2014.
European International Search Report for PCT/EP2014/067633, dated Oct. 29, 2014.
European International Search Report for PCT/EP2014/067629, dated Oct. 2, 2014.

(Continued)

Primary Examiner — Jennifer A Steele
(74) Attorney, Agent, or Firm — Meunier Carlin & Curfman LLC

(57) ABSTRACT

The present invention relates to a polymer composition comprising a polyolefin, peroxide and a sulphur containing antioxidant, wherein said peroxide is present in an amount which corresponds to X mmol —O—O—/kg polymer composition and said sulphur containing antioxidant is present in an amount which corresponds to Y mmol —OH/kg polymer composition, wherein $Y_1 \leq Y \leq Y_2$, $X \leq 45$ and $0.9*Y + m \leq X \leq n - k*Y$, wherein $Y_1$ is 0.50 and $Y_2$ is 10, and m is 0.8, n is 70 and k is 4.7; and wherein said polymer composition has a melt flow rate (MFR) of less than 1.7, and said polymer composition comprises less than 0.05% by weight (wt %) 2,4-Diphenyl-4-methyl-1-pentene; a crosslinked polymer composition, and use thereof, a power cable insulation, a power cable, useful in high voltage (HV DC) and extra high voltage (EHV DC) direct current applications, and a method for reducing electrical conductivity of a crosslinked polymer composition.

15 Claims, No Drawings

(56) References Cited

U.S. PATENT DOCUMENTS

2013/0313000 A1* 11/2013 Nilsson .......... C08K 5/375
174/120 SR
2016/0322129 A1 11/2016 Sunnegardh et al.

FOREIGN PATENT DOCUMENTS

| EP | 1731558 | A1 | | 12/2006 |
|---|---|---|---|---|
| EP | 1695996 | | | 7/2008 |
| EP | 2499172 | | | 9/2012 |
| EP | 2439234 | | | 4/2013 |
| EP | 3083795 | | | 10/2016 |
| EP | 3083795 | A1 | † | 10/2016 |
| JP | S63190206 | | | 8/1988 |
| JP | S6454605 | | | 3/1989 |
| JP | H0198643 | | | 4/1989 |
| JP | H0269541 | | | 3/1990 |
| JP | 2002128961 | A | | 5/2002 |
| JP | 2006182941 | | | 7/2006 |
| JP | 2012007111 | A | | 1/2012 |
| RU | 2394854 | | | 7/2010 |
| WO | 9308222 | | | 4/1993 |
| WO | 9635732 | | | 11/1996 |
| WO | 2006089744 | | | 8/2006 |
| WO | 2007123331 | A1 | | 11/2007 |
| WO | 2011057927 | A1 | | 5/2011 |
| WO | 2011057928 | A1 | | 5/2011 |
| WO | 2012150285 | A1 | | 11/2012 |
| WO | 2012150287 | | | 11/2012 |
| WO | 2013022206 | A2 | | 2/2013 |

OTHER PUBLICATIONS

Third Party Submission filed Dec. 22, 2016 in U.S. Appl. No. 15/105,226.
Third Party Submission filed Dec. 22, 2016 in U.S. Appl. No. 15/105,230.
Third Party Submission filed Dec. 22, 2016 in U.S. Appl. No. 15/105,238.
Non-Final Office Action dated Sep. 13, 2017 in U.S. Appl. No. 15/105,230.
Encyclopedia of Polymer Science and Engineering, vol. 6, 1986, pp. 383-410.
Klimesch, R., et al., "Polyethylene: High-pressure," Encyclopedia of Materials: Science and Technology, Elsevier Science Ltd., 2001, pp. 7181-7184.
Olsson, C.O., et al., "Experimental determination of DC conductivity for XLPE Insulation," Proceedings of the 21st Nordic Insulation Symposium (Nord-IS '09), Gothenburg, Sweden, Jun. 15-17, 2009, pp. 55-58.
Randall, J.C., "A Review of High Resolution Liquid 13Carbon Nuclear Magnetic Resonance Characterizations of Ethylene-Based Polymers," Journal of Macromolecular Science, Part C: Polymer Reviews, vol. 29, Issues 2-3, 1989, pp. 201-317.
Search Report dated Apr. 18, 2018 in related Russian application 2016125882/05(040492).
Final Office Action dated May 4, 2018 in related U.S. Appl. No. 15/105,230.
Andersson J et al. "Comparison of Test Setups for High Field Conductivity of HVDC Insulation Materials." Nordic Insulation Symposium, Nord-IS 13, Trondheim, Norway, Jun. 9-12, 2013, pp. 161-164.
European International Search Report for PCT/EP2014/067630, dated Oct. 17, 2014.
Non-Final Office Action dated Dec. 15, 2017 in U.S. Appl. No. 15/105,238.
Non-Final Office Action dated Jul. 20, 2018 in related U.S. Appl. No. 15/105,226.
Non-Final Office Action dated Dec. 15, 2017 in related U.S. Appl. No. 15/105,238.
Notice of Allowance dated Oct. 11, 2018 in related U.S. Appl. No. 15/105,238.
Corrected Notice of Allowance dated Oct. 29, 2018 in related U.S. Appl. No. 15/105,238.
Non-Final Office Action dated May 3, 2019 in related U.S. Appl. No. 15/105,230.
Notice of Allowance dated Mar. 19, 2019 in related U.S. Appl. No. 15/105,226.

\* cited by examiner
† cited by third party

LOW MFR POLYMER COMPOSITION, POWER CABLE INSULATION AND POWER CABLE

FIELD OF INVENTION

The invention relates to a polymer composition, a crosslinked polymer composition, a power cable insulation, and a power cable, which polymer composition, crosslinked polymer composition, power cable insulation, and power cable, may be especially useful in high voltage (HV) and extra high voltage (EHV) cable applications, for example, high voltage direct current (HV DC) applications and extra high voltage direct current (EHV DC) applications. The invention further relates to a method for reducing, i.e. for providing low, electrical conductivity of a crosslinked polymer composition, and to the use of the polymer composition and of the crosslinked polymer composition.

BACKGROUND ART

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition has a significant importance. Furthermore, the electrical properties of importance may differ in different cable applications, as is the case between alternating current (AC) and direct current (DC) cable applications.

Crosslinking of Cables

A typical power cable comprises a conductor surrounded, at least, by an inner semiconductive layer, an insulation layer and an outer semiconductive layer, in that order. The cables are commonly produced by extruding the layers on a conductor. The polymer material in one or more of said layers is then normally crosslinked to improve e.g. heat and deformation resistance, creep properties, mechanical strength, chemical resistance and abrasion resistance of the polymer in the layer(s) of the cable. In crosslinking reaction of a polymer interpolymer crosslinks (bridges) are primarily formed. Crosslinking can be achieved using e.g. a free radical generating compound, such as a peroxide. Free radical generating agent is typically incorporated to the layer material prior to, or during, the extrusion of the layer(s) on a conductor. After formation of the layered cable, the cable is then subjected to a crosslinking step to initiate the radical formation and thereby crosslinking reaction.

Peroxides are very common free radical generating compounds used i.a. in the polymer industry for said polymer modifications. The resulting decomposition products of peroxides may include volatile by-products which are undesired, since they may have a negative influence on the electrical properties of the cable. Therefore the volatile decomposition products such as methane e.g. where, for example, dicumylperoxide is used, are conventionally reduced to a minimum or removed after crosslinking and cooling step. Such removal step is generally known as a degassing step. The degassing step is time and energy consuming and is thus a costly operation in a cable manufacturing process.

Also the used cable production line and desired production speed can bring limitations to the cable materials especially when producing power cables of a larger size. Moreover, i.a. the crosslinking rate and the crosslinking degree of the polymer in the cable layer should be sufficient in order to minimize or avoid any undesirable sagging problem occurring during the cable production, particularly when the cable is produced e.g. in a catenary continuous vulcanization (CCV) line (especially for thicker constructions), which is a well known vulcanisation line type in the field and described in the literature.

Electrical Conductivity

The DC electrical conductivity is an important material property e.g. for insulating materials for high voltage direct current (HV DC) cables. First of all, the temperature and electric field dependence of this property will influence the electric field. The second issue is the fact that heat will be generated inside the insulation by the electric leakage current flowing between the inner and outer semiconductive layers. This leakage current depends on the electric field and the electrical conductivity of the insulation. High conductivity of the insulating material can even lead to thermal runaway under high stress/high temperature conditions. The conductivity must therefore be sufficiently low to avoid thermal runaway.

Accordingly, in HV DC cables, the insulation is heated by the leakage current. For a specific cable design the heating is proportional to the insulation conductivity×(electrical field)$^2$. Thus, if the voltage is increased, far more heat will be generated.

There are high demands to increase the voltage of a power cable to achieve an increased power transmission, for example, of direct current DC power cable, and, e.g., EP2499172 provides a polymer composition which comprises a polyolefin and which has properties making it suitable for a DC power cable.

However, there is still a continuous need to find alternative polymer compositions with reduced conductivity. Such polymer compositions should suitably also have good mechanical properties required for demanding power cable embodiments.

OBJECTS OF THE INVENTION

One of the objects of the present invention is to provide an alternative polymer composition comprising a polyolefin, peroxide and a sulphur containing antioxidant and which polymer composition has surprisingly advantageous properties suitable for a power cable, e.g. a DC power cable.

A further object of the invention is to provide a crosslinked polymer composition which is obtained by crosslinking the polymer composition of the present invention.

Still a further object of the invention is to provide a power cable insulation which comprises the polymer composition and/or the crosslinked polymer composition, both of the present invention.

Another object of the invention is to provide a power cable which comprises the polymer composition, the crosslinkable polymer composition, a crosslinked polymer composition, or a power cable insulation, all in accordance with the present invention.

An even further object of the invention is to provide a method for reducing electrical conductivity, i.e. for providing low electrical conductivity, of a crosslinked polymer composition comprising a polyolefin crosslinked with peroxide in the presence of the sulphur containing antioxidant.

Still an even further object of the invention is use of the polymer composition, or, alternatively, the crosslinked polymer composition, both of the present invention, for producing at least one layer, e.g., at least an insulation layer, of a crosslinked power cable, e.g., of a crosslinked direct current (DC) power cable.

The invention and further objects thereof are described and defined in details herein.

DESCRIPTION OF THE INVENTION

The present invention provides a polymer composition comprising a polyolefin, peroxide and a sulphur containing antioxidant, wherein said peroxide is present in an amount which corresponds to X mmol —O—O—/kg polymer composition and said sulphur containing antioxidant is present in an amount which corresponds to Y mmol —OH/kg polymer composition, wherein $Y_1 \leq Y \leq Y_2$, $X \leq 45$ and
$0.9*Y+m \leq X \leq n-k*Y$, wherein
$Y_1$ is 0.50 and $Y_2$ is 10, and
m is 0.8, n is 70 and k is 4.7; and
wherein said polymer composition has a melt flow rate (MFR) of less than 1.7, and
said polymer composition comprises less than 0.05% by weight (wt %) 2,4-Diphenyl-4-methyl-1-pentene.

The polymer composition may be a crosslinkable polymer composition.

Note that by melt flow rate (MFR) herein it is meant $MFR_2$ (2.16 kg, 190° C.).

"Crosslinkable" means that the crosslinkable polymer composition, which may, for example, be comprised in a cable layer, can be crosslinked before the use in the end application thereof. The crosslinkable polymer composition comprises the polyolefin, peroxide and a sulphur containing antioxidant, and the peroxide and a sulphur containing antioxidant in amounts as defined above, below or in claims. Further, said polymer composition has a melt flow rate (MFR) of less than 1.7, and comprises less than 0.05 wt % 2,4-Diphenyl-4-methyl-1-pentene. Moreover, the crosslinked polymer composition or, respectively, the crosslinked polyolefin, is crosslinked via radical reaction using the claimed amount of peroxide present in the polymer composition before crosslinking. The crosslinked polymer composition has a typical network, i.a. interpolymer crosslinks (bridges), as well known in the field. As evident for a skilled person, the crosslinked polymer can be and is defined herein with features that are present in the polymer composition or polyolefin before or after the crosslinking, as stated or evident from the context. For instance, the amounts of the polyolefin, peroxide and sulphur containing antioxidant, as well as the presence and the amount of 2,4-Diphenyl-4-methyl-1-pentene, in the polymer composition or the type and compositional properties, such as MFR, density and/or unsaturation degree, of the polyolefin component are defined, unless otherwise stated, before crosslinking. Moreover, the features after the crosslinking are, e.g., the Oxidation Induction Time, the electrical conductivity, crosslinking degree or mechanical properties measured from the crosslinked polymer composition.

Further, with regard to said sulphur containing antioxidant, which is present in an amount which corresponds to Y mmol —OH/kg polymer composition, the "—OH" herein, in this context, is understood to be phenolic —OH.

The present invention further provides a crosslinked polymer composition comprising a crosslinked polyolefin, wherein the polymer composition comprises prior to crosslinking (i.e. before it is crosslinked) a polyolefin, peroxide and a sulphur containing antioxidant, wherein said peroxide is present in an amount which corresponds to X mmol —O—O—/kg polymer composition and said sulphur containing antioxidant is present in an amount which corresponds to Y mmol —OH/kg polymer composition, wherein X and Y are as defined herein, and wherein said polymer composition has a melt flow rate (MFR) of less than 1.7, and comprises less than 0.05 wt % 2,4-Diphenyl-4-methyl-1-pentene.

Accordingly, the crosslinked polymer composition is an embodiment of the present invention and is obtainable by crosslinking a polymer composition as defined herein.

The present invention further provides a crosslinked polymer composition comprising a polyolefin which is crosslinked with peroxide and in the presence of a sulphur containing antioxidant, wherein the peroxide is used in an amount which corresponds to X mmol —O—O—/kg polymer composition, and said sulphur containing antioxidant is present in an amount which corresponds to Y mmol —OH/kg polymer composition, wherein X and Y are as defined herein, and wherein said polymer composition has a melt flow rate (MFR) of less than 1.7, and comprises less than 0.05 wt % 2,4-Diphenyl-4-methyl-1-pentene.

The expressions "obtainable by crosslinking", "crosslinked with" and "crosslinked polymer composition" are used herein interchangeably and mean the category "product-by-process", i.e. that the product has a technical feature which is due to the crosslinking step as will be explained below.

The unit "mmol —O—O—/kg polymer composition" means herein the content (mmol) of peroxide functional groups per kg polymer composition, when measured from the polymer composition prior to crosslinking. For instance, 35 mmol —O—O—/kg polymer composition corresponds to 0.95 wt % of the well known dicumyl peroxide based on the total amount (100 wt %) of the polymer composition.

Beside the "polymer composition", also the "crosslinked polymer composition" may be referred herein below shortly as "Polymer composition" or "polymer composition". Further, also the "crosslinkable polymer composition" may be referred herein below shortly as "Polymer composition" or "polymer composition". The meaning will be evident from the context.

Unexpectedly, when a polymer composition is crosslinked using said amount of peroxide (e.g. a well known dicumyl peroxide) in the presence of said amount of a sulphur containing antioxidant, wherein the amounts, are as defined herein,
and wherein said polymer composition has a melt flow rate (MFR) of less than 1.7, and in the presence of less than 0.05 wt % 2,4-Diphenyl-4-methyl-1-pentene, both the Oxidation Induction Time as well as the electrical conductivity of the polymer composition are reduced, i.e. lowered. The electrical conductivity of the polymer composition is reduced in comparison to the electrical conductivity of conventional polymer material suitable for power cables, while desired mechanical properties are maintained.

The polymer composition of the present invention results, after a crosslinking procedure, in a crosslinked polymer composition which has a reduced Oxidation Induction Time, and, surprisingly, and simultaneously, electrical properties expressed i.a. as reduced, i.e. low, electrical conductivity, wherein the undesired heat formation, e.g. in the insulation layer of a power cable, for example, a DC power cable, can be minimised. The invention is particularly advantageous for DC power cables.

Further, a low oxidation induction time means that the concentration of phenolic groups is low. However, it has shown that this does not necessarily have to be associated with poor thermo oxidative resistance. There is sulphur containing antioxidants that have a limited contribution to the oxidation induction time, but still are able to adequately protect the material against oxidation.

The Oxidation Induction Time method, determined according to ASTM-D3895, ISO/CD 11357 and EN 728 using a Differential Scanning calorimeter (DSC), is described under "Determination Methods".

The electrical conductivity is measured herein according to DC conductivity method as described under "Determination Methods". "Reduced" or "low" electrical conductivity as used herein interchangeably mean that the value obtained from the DC conductivity method is low, i.e. reduced.

The low electrical conductivity of the Polymer composition is very advantageous i.a. in a power cable, for example, in an AC or DC power cable, e.g., in direct current (DC) power cables, for example, in low voltage (LV), medium voltage (MV), high voltage (HV) or extra high voltage (EHV) DC cables, for example, in DC power cables operating at any voltages, for example, at higher than 320 kV, such as EHV DC cables.

Moreover, the electrical conductivity of the Polymer composition is surprisingly low even without removing the volatile by-products after crosslinking, i.e. without degassing, compared to electrical conductivity of a non-degassed conventional polymer composition. Therefore, if desired, the degassing step of the crosslinked cable containing the Polymer composition can be considerably shortened and/or affected in less demanding conditions during cable production process which naturally improves the cable production efficiency. Accordingly, if desired the degassing step during the cable production can be shortened.

The invention is further directed to a method for reducing, i.e. providing low, electrical conductivity of a crosslinked polymer composition comprising a polyolefin crosslinked with peroxide in the presence of a sulphur containing antioxidant, and wherein said polymer composition has a melt flow rate (MFR) of less than 1.7, and in the presence of less than 0.05 wt % 2,4-Diphenyl-4-methyl-1-pentene, wherein the method comprises a step of producing the crosslinked polyolefin by crosslinking the polyolefin with peroxide, in an amount which corresponds to X mmol —O—O—/kg polymer composition, in the presence of a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein.

Moreover, the invention is directed to a method for reducing the electrical conductivity of a crosslinked polymer composition of a crosslinked power cable, for example, of a crosslinked direct current (DC) power cable, e.g., of a crosslinked HV DC or EHV DC power cable, comprising a conductor which is surrounded by at least an insulation layer, for example, at least by an inner semiconductive layer, an insulation layer and an outer semiconductive layer, in that order, wherein at least the insulation layer comprises a polymer composition comprising a polyolefin crosslinked with peroxide in the presence of a sulphur containing antioxidant, and wherein said polymer composition has a melt flow rate (MFR) of less than 1.7, and in the presence of less than 0.05 wt % 2,4-Diphenyl-4-methyl-1-pentene, wherein the method comprises a step of producing the crosslinked polyolefin by crosslinking the polyolefin with peroxide, in an amount which corresponds to X mmol —O—O—/kg polymer composition, in the presence of a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein. In this method it is suitable to use the Polymer composition as defined herein.

Further, the invention provides a crosslinkable power cable insulation, for example, a crosslinkable direct current (DC) power cable insulation, which insulation comprises a polymer composition comprising a crosslinkable polyolefin, peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein.

In a further embodiment of the present invention it is provided a crosslinkable power cable insulation, for example, a crosslinkable direct current (DC) power cable insulation, e.g., a crosslinkable HV DC or EHV DC power cable insulation, wherein the insulation comprises a crosslinkable polymer composition of the invention comprising a polyolefin, peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein.

Accordingly, the invention also further provides a crosslinkable power cable, for example, a crosslinkable direct current (DC) power cable, comprising a conductor surrounded by one or more layers, wherein at least one of said layer(s) comprises a polymer composition comprising a crosslinkable polyolefin, peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein.

Furthermore, the invention is directed to a crosslinkable power cable, for example, to a crosslinkable direct current (DC) power cable, e.g., to a crosslinkable HV DC or EHV DC power cable, comprising a conductor surrounded by at least an inner semiconductive layer, an insulation layer and an outer semiconductive layer, in that order, wherein at least one layer, for example, the insulation layer, comprises a crosslinkable polymer composition of the invention comprising a polyolefin, peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein.

The invention is further directed to a crosslinked power cable insulation, for example, to a crosslinked direct current (DC) power cable insulation, comprising a conductor surrounded by one or more layers, wherein at least one of said layer(s) comprises a crosslinked polymer composition comprising a polyolefin crosslinked with peroxide in the presence of a sulphur containing antioxidant, and wherein said polymer composition has a melt flow rate (MFR) of less than 1.7, and in the presence of less than 0.05 wt % 2,4-Diphenyl-4-methyl-1-pentene, wherein the crosslinking method comprises a step of producing the crosslinked polyolefin by crosslinking the polyolefin with peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein.

Further, the invention is directed to a crosslinked power cable insulation, for example, to a crosslinked direct current (DC) power cable insulation, e.g., to a crosslinked HV DC or EHV DC power cable insulation, wherein the insulation comprises a crosslinked polymer composition comprising a polyolefin crosslinked with peroxide in the presence of a sulphur containing antioxidant, and wherein said polymer composition has a melt flow rate (MFR) of less than 1.7, and in the presence of less than 0.05 wt % 2,4-Diphenyl-4-methyl-1-pentene, wherein the crosslinking method comprises a step of producing the crosslinked polyolefin by crosslinking the polyolefin with peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein.

The expression in the crosslinked cable of "crosslinking the polyolefin with peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein" means that the polymer composition before crosslinking contains the polyolefin, peroxide and the sulphur containing antioxidant in said amounts.

The invention is further directed to a crosslinked power cable, for example, to a crosslinked direct current (DC) power cable, comprising a conductor surrounded by one or more layers, wherein at least one of said layer(s) comprises a crosslinked polymer composition comprising a polyolefin crosslinked with peroxide in the presence of a sulphur containing antioxidant, and wherein said polymer composition has a melt flow rate (MFR) of less than 1.7, and in the presence of less than 0.05 wt % 2,4-Diphenyl-4-methyl-1-pentene, wherein the crosslinking method comprises a step of producing the crosslinked polyolefin by crosslinking the polyolefin with peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein.

Further, the invention is directed to a crosslinked power cable, for example, to a crosslinked direct current (DC) power cable, e.g., to a crosslinked HV DC or EHV DC power cable, comprising a conductor surrounded by at least an inner semiconductive layer, an insulation layer and an outer semiconductive layer, in that order, wherein at least one layer, for example, the insulation layer, comprises a crosslinked polymer composition comprising a polyolefin crosslinked with peroxide in the presence of a sulphur containing antioxidant, and wherein said polymer composition has a melt flow rate (MFR) of less than 1.7, and in the presence of less than 0.05 wt % 2,4-Diphenyl-4-methyl-1-pentene, wherein the crosslinking method comprises a step of producing the crosslinked polyolefin by crosslinking the polyolefin with peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein.

The expression in the crosslinked cable of "peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein." means that the polymer composition, before crosslinking, has said MFR and comprises the polyolefin, peroxide, sulphur containing antioxidant and 2,4-Diphenyl-4-methyl-1-pentene (if present), in said amounts.

The below subgroups, properties and embodiments of the polymer composition apply equally and independently to the polymer composition as such, as well as to the polymer composition of the invention in the method for reducing electrical conductivity, to the methods for reducing the electrical conductivity and also to the crosslinkable cable insulation and to the crosslinked cable insulation, as well as to the crosslinkable cable and to the crosslinked cable, as defined herein.

In further embodiments of the present invention, a polymer composition, as described herein, is disclosed, wherein $Y_1$ is 0.50, 1.0, 1.5, 2.0, 2.5 or 3.0.

In still further embodiments of the present invention, a polymer composition, as described herein, is disclosed, wherein $Y_2$ is 10, 9.8, 9.6, 9.4, 9.2, 9.0, 8.8, 8.6, 8.4, 8.2, 8.0, 7.8, 7.6, 7.4, 7.2, 7.0, 6.8, 6.6, 6.5, 6.4, 6.2, 6.1 or 6.0.

In further embodiments of the present invention, a polymer composition, as described herein, is disclosed, wherein $X \le 45$, $X \le 40$, $X \le 38$ or, alternatively, $X \le 35$.

In even further embodiments of the present invention, a polymer composition, as described herein, is disclosed, wherein m is 0.8, 1.0, 1.5, 2.0, 2.5 or 3.0.

In further embodiments of the present invention, a polymer composition, as described herein, is disclosed, wherein n is 70, 68, 66, 65, 62 or 60.

In even further embodiments of the present invention, a polymer composition, as described herein, is disclosed, wherein k is 4.7, 4.8, 4.9 or 5.0.

In a further embodiment of the present invention a polymer composition, as described herein, is disclosed, wherein $Y_1$ is 2.0, $Y_2$ is 9.0 and $X \le 35$, and m is 3.0, n is 65 and k is 4.7.

In even a further embodiment of the present invention a polymer composition, as described herein, is disclosed, wherein $Y_1$ is 2.0, $Y_2$ is 8.0 and $X \le 35$, and m is 3.0, n is 65 and k is 4.7.

In still a further embodiment of the present invention a polymer composition, as described herein, is disclosed, wherein $Y_1$ is 2.0, $Y_2$ is 7.0 and $X \le 35$, and m is 3.0, n is 65 and k is 4.7.

In a still even further embodiment of the present invention a polymer composition, as described herein, is disclosed, wherein $Y_1$ is 2.0, $Y_2$ is 6.0 and X≤35, and m is 3.0, n is 65 and k is 4.7.

In further embodiments of the present invention, a polymer composition, as described herein, is disclosed, wherein n is 59, 55, 50, 48 or 45.

In still further embodiments of the present invention a polymer composition, as described herein, is disclosed, wherein m is 5.0 and n is 65, m is 7.0 and n is 65, m is 10.0 and n is 65, or, alternatively, m is 15 and n is 65.

In a further embodiment of the present invention a polymer composition, as described herein is disclosed, wherein m is 17 and n is 64.

In an even further embodiment of the present invention a polymer composition as described herein is disclosed, wherein m is 10.0 and n is 65.

In still further embodiment of the present invention a polymer composition, as described herein, is disclosed, wherein m is 12.0 and n is 63, m is 14.0 and n is 61, m is 16.0 and n is 59, or, alternatively, m is 18.0 and n is 57.

In further embodiments of the present invention a polymer composition, as described herein, is disclosed, wherein m is 12.0 and n is 61, m is 14.0 and n is 59, m is 16.0 and n is 57, or, alternatively, m is 18.0 and n is 55.

In still even further embodiments of the present invention a polymer composition, as described herein, is disclosed, wherein m is 14.0 and n is 63, m is 16.0 and n is 61, m is 18.0 and n is 59, or, alternatively, m is 20.0 and n is 57.

Furthermore, the polyolefin may be unsaturated, wherein the peroxide content may depend on the unsaturation degree.

In case the cable is produced in a catenary continuous vulcanization cable line, then in the polymer composition, as described herein, m may suitably be 7 or 15 and n may be 65.

In a further embodiment of the present invention a polymer composition, as described herein, is disclosed, wherein m is 10.0 and n is 60.

In still a further embodiment of the present invention a polymer composition, as described herein, is disclosed, wherein $Y_1$ is 2 and $Y_2$ is 6.5.

In even a further embodiment of the present invention a polymer composition as described herein is disclosed, wherein $Y_1$ is 2.5 and $Y_2$ is 6.0.

Still a further embodiment of the present invention discloses a polymer composition as described herein, wherein said polymer composition has a melt flow rate (MFR) of 0.2 to of less than 1.7.

A further embodiment of the present invention discloses a polymer composition as described herein, wherein said polymer composition comprises less than 0.03 wt % 2,4-Diphenyl-4-methyl-1-pentene.

In still a further embodiment of the present invention a polymer composition, as described herein, is disclosed, wherein said polymer composition comprises less than 0.01 wt % 2,4-Diphenyl-4-methyl-1-pentene.

In an even further embodiment of the present invention a polymer composition as described herein is disclosed, wherein said polymer composition comprises no 2,4-Diphenyl-4-methyl-1-pentene.

Still a further embodiment of the present invention discloses a polymer composition as described herein, wherein said polymer composition comprises neither any crosslinking booster(s) nor any scorch retarder additive(s). Said crosslinking booster(s) is/are understood, in this context, herein, to be low molecular weight crosslinking booster(s).

A further embodiment of the present invention discloses a method, as described herein, for reducing, i.e. providing low, electrical conductivity of a crosslinked polymer composition, wherein the method comprises the crosslinking in absence of any crosslinking booster(s) or any scorch retarder additive(s).

An even further embodiment of the present invention discloses a method, as described herein, for reducing the electrical conductivity of a crosslinked polymer composition of a crosslinked power cable, wherein the method comprises the crosslinking in absence of any crosslinking booster(s) or any scorch retarder additive(s).

A further embodiment of the present invention discloses a crosslinking method, as described herein, wherein the crosslinking method comprises the crosslinking in absence of any crosslinking booster(s) or any scorch retarder additive(s).

In a further embodiment of the present invention a polymer composition, as described herein is disclosed, wherein said polymer composition is a crosslinkable polymer composition.

A further embodiment of the present invention discloses a crosslinked polymer composition, wherein said crosslinked polymer composition is obtained by crosslinking a polymer composition, as described herein.

An even further embodiment of the present invention discloses a crosslinked polymer composition which is obtained in a method comprising exposure of a polymer composition, as described herein, to a curing procedure, during which curing procedure said polymer composition is crosslinked.

Crosslinking can be carried out at increased temperature which is chosen, as well known, depending on the type of crosslinking agent. For instance temperatures above 150° C., e.g. 160 to 350° C., are typical, however without limiting thereto.

A further embodiment of the present invention discloses a crosslinked polymer composition, wherein a polymer composition is exposed to a curing procedure during which the maximum temperature of said polymer composition is, for example, above 150° C., e.g. 160 to 350° C., e.g. less than 280° C., e.g. 250° C. or less, or, for example, 180° C. or less.

An even further embodiment of the present invention discloses a crosslinked polymer composition, wherein a polymer composition is exposed to a curing procedure during which the maximum temperature of said polymer composition is 270° C. or less, 260° C. or less, 250° C. or less, 240° C. or less, 230° C. or less, 220° C. or less, 210° C. or less, 200° C. or less, 190° C. or less, or, alternatively, 180° C. or less.

Still a further embodiment of the present invention discloses a crosslinked polymer composition, wherein a polymer composition is exposed to a curing procedure during which the maximum temperature of said polymer composition is 270° C. or less, 265° C. or less, 260° C. or less, 255° C. or less, 250° C. or less, 245° C. or less, 240° C. or less, 235° C. or less, 230° C. or less, 225° C. or less, 220° C. or less, 215° C. or less, 210° C. or less, 205° C. or less, 200° C. or less, 195° C. or less, 190° C. or less, 185° C. or less, or, alternatively, 180° C. or less.

An even further embodiment of the present invention discloses a crosslinked polymer composition, wherein a polymer composition is exposed to a curing procedure during which the maximum temperature of said polymer composition is 250° C. or less, 245° C. or less, 240° C. or less, 235° C. or less, 230° C. or less, 225° C. or less, 220°

C. or less, 215° C. or less, 210° C. or less, 205° C. or less, 200° C. or less, 195° C. or less, 190° C. or less, 185° C. or less, or, alternatively, 180° C. or less.

A further embodiment of the present invention discloses a crosslinked polymer composition, wherein a polymer composition is exposed to a curing procedure during which the maximum temperature of said polymer composition is 180° C. or less.

Still a further embodiment of the present invention discloses a crosslinked polymer composition, wherein a polymer composition is exposed to a curing procedure during which the maximum temperature of said polymer composition is at least 150° C. or, alternatively, at least 160° C.

In a further embodiment, the crosslinked polymer composition of the invention has after the crosslinking an Oxidation Induction Time, determined according to ASTM-D3895, ISO/CD 11357 and EN 728 using a Differential Scanning calorimeter (DSC), which is 40 minutes, or less, or, alternatively, 30 minutes, or less.

The Oxidation Induction Time method ASTM-D3895, ISO/CD 11357 and EN 728 is described under "Determination Methods".

In still a further embodiment, the crosslinked polymer composition of the invention has after the crosslinking an Oxidation Induction Time, determined according to ASTM-D3895, ISO/CD 11357 and EN 728, which is 25 minutes, or less, 22 minutes, or less, 20 minutes, or less, 18 minutes, or less, 16 minutes, or less, 15 minutes, or less, 14 minutes, or less, 12 minutes, or less, 10 minutes, or less, 9 minutes, or less, or, alternatively, 8 minutes, or less.

A further embodiment of the present invention discloses a crosslinked polymer composition, as described herein, wherein said crosslinked polymer composition has an Oxidation Induction Time, determined according to ASTM-D3895, ISO/CD 11357 and EN 728, which is 15 minutes, or less.

An even further embodiment of the present invention discloses a crosslinked polymer composition, as described herein, wherein said crosslinked polymer composition has an Oxidation Induction Time, determined according to ASTM-D3895, ISO/CD 11357 and EN 728, which is 15 minutes, or less, 14 minutes, or less, 12 minutes, or less, 10 minutes, or less, 9 minutes, or less, or, alternatively, 8 minutes, or less.

Still a further embodiment of the present invention discloses a crosslinked polymer composition, as described herein, wherein said crosslinked polymer composition has an Oxidation Induction Time, determined according to ASTM-D3895, ISO/CD 11357 and EN 728, which is from 1 to 20, 2 to 20, 3 to 20, or, alternatively, 4 to 20 minutes.

Still an even further embodiment of the present invention discloses a crosslinked polymer composition, as described herein, wherein said crosslinked polymer composition has an Oxidation Induction Time, determined according to ASTM-D3895, ISO/CD 11357 and EN 728, which is from 1 to 18, 2 to 18, 3 to 18, or, alternatively, 4 to 18 minutes.

A further embodiment of the present invention discloses a crosslinked polymer composition, as described herein, wherein said crosslinked polymer composition has an Oxidation Induction Time, determined according to ASTM-D3895, ISO/CD 11357 and EN 728, which is from 1 to 16, 2 to 16, 3 to 16, or, alternatively, 4 to 16 minutes.

An even further embodiment of the present invention discloses a crosslinked polymer composition, as described herein, wherein said crosslinked polymer composition has an Oxidation Induction Time, determined according to ASTM-D3895, ISO/CD 11357 and EN 728, which is from 1 to 15, 2 to 15, 3 to 15, or, alternatively, 4 to 15 minutes.

Still a further embodiment of the present invention discloses a crosslinked polymer composition, as described herein, wherein said crosslinked polymer composition has an Oxidation Induction Time, determined according to ASTM-D3895, ISO/CD 11357 and EN 728, which is from 1 to 14, 2 to 14, 3 to 14, or, alternatively, 4 to 14 minutes.

A further embodiment of the present invention discloses a crosslinked polymer composition, as described herein, wherein said crosslinked polymer composition has an Oxidation Induction Time, determined according to ASTM-D3895, ISO/CD 11357 and EN 728, which is from 1 to 12, 2 to 12, 3 to 12, or, alternatively, 4 to 12 minutes.

An even further embodiment of the present invention discloses a crosslinked polymer composition, as described herein, wherein said crosslinked polymer composition has an Oxidation Induction Time, determined according to ASTM-D3895, ISO/CD 11357 and EN 728, which is from 1 to 10, 2 to 10, 3 to 10, or, alternatively, 4 to 10 minutes.

Still a further embodiment of the present invention discloses a crosslinked polymer composition, as described herein, wherein said crosslinked polymer composition has an Oxidation Induction Time, determined according to ASTM-D3895, ISO/CD 11357 and EN 728, which is from 1 to 9, 2 to 9, 3 to 9, or, alternatively, 4 to 9 minutes.

A further embodiment of the present invention discloses a crosslinked polymer composition, as described herein, wherein said crosslinked polymer composition has an Oxidation Induction Time, determined according to ASTM-D3895, ISO/CD 11357 and EN 728, which is from 1 to 8, 2 to 8, 3 to 8, or, alternatively, 4 to 8 minutes.

Furthermore, the crosslinked polymer composition of the invention, or, alternatively, the power cable insulation of the invention, has after the crosslinking an electrical conductivity of 45 fS/m or less, when measured according to DC conductivity method as described under "Determination Methods". The crosslinked polymer composition of the invention, or, alternatively, the power cable insulation of the invention, has, in a further embodiment, an electrical conductivity of 40 fS/m or less, in an even further embodiment, from 0.01 to 38 fS/m, and, in still a further embodiment, from 0.5 to 35 fS/m, when measured according to DC conductivity method as described under "Determination Methods".

In further embodiments of the present invention, the crosslinked polymer composition of the invention, or, alternatively, the power cable insulation of the invention, comprises, for example, a crosslinked low density polyethylene (LDPE) polymer, as defined herein and including the exemplified subgroups and embodiments thereof, and has an electrical conductivity of 0.01 to 45 fS/m, for example, 0.01 to 40 fS/m, e.g. 0.01 to 38 fS/m, for example, 0.01 to 35 fS/m, an electrical conductivity 0.01 to 45 fS/m, for example, 0.01 to 40 fS/m, e.g. 0.01 to 38 fS/m, for example, 0.01 to 35 fS/m, 0.1 to 45 fS/m, for example, 0.1 to 40 fS/m, e.g. 0.1 to 38 fS/m, for example, 0.1 to 35 fS/m, 1 to 45 fS/m, for example, 1 to 40 fS/m, e.g. 1 to 38 fS/m, or, for example, 1 to 35 fS/m, when measured according to DC conductivity method as described under "Determination Methods".

Accordingly, the crosslinked polymer composition of the invention is used for determining its various properties. The sample preparations of the crosslinked polymer, in each of the various determinations, are described below under the "Determination methods".

The invention is directed also to a process for producing a crosslinkable and crosslinked power cable, for example, a crosslinkable and crosslinked direct current (DC) power cable, as defined herein.

The further exemplified subgroups of the above properties, further properties, variants and embodiments as defined herein for the Polymer composition or for the components thereof apply similarly to the method for reducing electrical conductivity, to the power cable, for example, to the DC power cable, of the invention.

Polyolefin Component

The following exemplified embodiments, properties and subgroups of the polyolefin component suitable for the Polymer composition are generalisable so that they can be used in any order or combination to further define the exemplified embodiments of the Polymer composition. Moreover, it is evident that the given description applies to the polyolefin before it is crosslinked.

The term polyolefin means both an olefin homopolymer and a copolymer of an olefin with one or more comonomer(s). As well known "comonomer" refers to copolymerisable comonomer units.

The polyolefin can be any polyolefin, such as any conventional polyolefin, which is suitable as a polymer in a layer, for example, an insulating layer, of an electrical cable, e.g., of a power cable.

The polyolefin can be e.g. a commercially available polymer or can be prepared according to or analogously to known polymerisation process described in the chemical literature.

Furthermore, the polyolefin may suitably be a polyethylene produced in a high pressure process, for example, a low density polyethylene LDPE produced in a high pressure process. The meaning of LDPE polymer is well known and documented in the literature. Although the term LDPE is an abbreviation for low density polyethylene, the term is understood not to limit the density range, but covers the LDPE-like high pressure (HP) polyethylenes with low, medium and higher densities. The term LDPE describes and distinguishes only the nature of HP polyethylene with typical features, such as different branching architecture, compared to the PE produced in the presence of an olefin polymerisation catalyst.

The LDPE as said polyolefin may be a low density homopolymer of ethylene (referred herein as LDPE homopolymer) or a low density copolymer of ethylene with one or more comonomer(s) (referred herein as LDPE copolymer). The one or more comonomers of LDPE copolymer may suitably be selected from the polar comonomer(s), non-polar comonomer(s) or from a mixture of the polar comonomer(s) and non-polar comonomer(s), as defined herein. Moreover, said LDPE homopolymer or LDPE copolymer as said polyolefin may optionally be unsaturated.

As a polar comonomer for the LDPE copolymer as said polyolefin, comonomer(s) containing hydroxyl group(s), alkoxy group(s), carbonyl group(s), carboxyl group(s), ether group(s) or ester group(s), or a mixture thereof, can be used. In a further embodiment, comonomer(s) containing carboxyl and/or ester group(s) are used as said polar comonomer. In still a further embodiment, the polar comonomer(s) of LDPE copolymer is selected from the groups of acrylate(s), methacrylate(s) or acetate(s), or any mixtures thereof. If present in said LDPE copolymer, the polar comonomer(s) may, for example, be selected from the group of alkyl acrylates, alkyl methacrylates or vinyl acetate, or a mixture thereof. In a further embodiment, said polar comonomers may be selected from $C_1$- to $C_6$-alkyl acrylates, $C_1$- to $C_6$-alkyl methacrylates or vinyl acetate. In even a further embodiment, said polar LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer as said polyolefin, comonomer(s) other than the above defined polar comonomers can be used. In a further embodiment, the non-polar comonomers are other than comonomer(s) containing hydroxyl group(s), alkoxy group(s), carbonyl group(s), carboxyl group(s), ether group(s) or ester group(s). One group of exemplified non-polar comonomer(s) comprise, may suitably consist of, monounsaturated (=one double bond) comonomer(s), for example, olefins, e.g. alpha-olefins, for example, $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it suitably comprises 0.001 to 50 wt %, for example, 0.05 to 40 wt %, e.g., less than 35 wt %, for example, less than 30 wt %, e.g., less than 25 wt %, of one or more comonomer(s).

The Polymer composition, suitably the polyolefin component thereof, for example, the LDPE polymer, may optionally be unsaturated, i.e. the polymer composition, suitably the polyolefin, for example, the LDPE polymer, may comprise carbon-carbon double bonds. The "unsaturated" means herein that the polymer composition, suitably the polyolefin, (prior to crosslinking of the polymer composition) contains carbon-carbon double bonds/1000 carbon atoms in a total amount of at least 0.1; at least 0.2; at least 0.3 or alternatively, at least 0.4/1000 carbon atoms.

As well known, the unsaturation can be provided to the Polymer composition i.a. by means of the polyolefin, a low molecular weight (Mw) compound(s), such as crosslinking booster(s) or scorch retarder additive(s), or any combinations thereof. The total amount of double bonds means herein double bonds determined from the source(s) that are known and deliberately added to contribute to the unsaturation. If two or more above sources of double bonds are chosen to be used for providing the unsaturation, then the total amount of double bonds in the Polymer composition means the sum of the double bonds present in the double-bond sources. It is evident that a characteristic model compound for calibration is used for each chosen source to enable the quantitative infrared (FTIR) determination. Any double bond measurements are carried out prior to cross-linking If the polymer composition is unsaturated prior to cross-linking, then it is suitable that the unsaturation originates at least from an unsaturated polyolefin component. For example, the unsaturated polyolefin is an unsaturated polyethylene, e.g., an unsaturated LDPE polymer, for example, an unsaturated LDPE homopolymer or an unsaturated LDPE copolymer. When polyunsaturated comonomer(s) are present in the LDPE polymer as said unsaturated polyolefin, then the LDPE polymer is an unsaturated LDPE copolymer.

In an embodiment of the present invention the term "total amount of carbon-carbon double bonds" is defined from the unsaturated polyolefin, and refers, if not otherwise specified, to the combined amount of double bonds which originate from vinyl groups, vinylidene groups and trans-vinylene groups, if present. Naturally the polyolefin does not necessarily contain all the above three types of double bonds. However, any of the three types, when present, is calculated to the "total amount of carbon-carbon double bonds". The amount of each type of double bond is measured as indicated under "Determination methods".

If an LDPE homopolymer is unsaturated, then the unsaturation can be provided e.g. by a chain transfer agent (CTA), such as propylene, and/or by polymerisation conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is suitably an unsaturated LDPE copolymer of ethylene with at least one polyunsaturated comonomer, and optionally with other comonomer(s), such as polar comonomer(s) which is suitably selected from acrylate or acetate comonomer(s). For example, an unsaturated LDPE copolymer is an unsaturated LDPE copolymer of ethylene with at least polyunsaturated comonomer(s).

The polyunsaturated comonomers suitable for the unsaturated polyolefin consist, for example, of a straight carbon chain with at least 8 carbon atoms and at least 4 carbons between the non-conjugated double bonds, of which at least one is terminal, e.g., said polyunsaturated comonomer is a diene, preferably a diene which comprises at least eight carbon atoms, the first carbon-carbon double bond being terminal and the second carbon-carbon double bond being non-conjugated to the first one. Exemplified dienes are selected from $C_8$ to $C_{14}$ non-conjugated dienes or mixtures thereof, e.g., selected from 1,7-octadiene, 1,9-decadiene, 1,11-dodecadiene, 1,13-tetradecadiene, 7-methyl-1,6-octadiene, 9-methyl-1,8-decadiene, or mixtures thereof. The diene is, for example, selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the C—C double bonds, for example, to the total amount of the vinyl groups. Herein, when a compound which can also act as comonomer, such as propylene, is used as CTA for providing double bonds, then said copolymerisable comonomer is not calculated to the comonomer content.

If the polyolefin, for example, the LDPE polymer, is unsaturated, then it has, e.g., a total amount of carbon-carbon double bonds, which originate from vinyl groups, vinylidene groups and trans-vinylene groups, if present, of more than 0.1; more than 0.2; more than 0.3; more than 0.4 or, alternatively, more than 0.5/1000 carbon atoms. The upper limit of the amount of carbon-carbon double bonds present in the polyolefin is not limited and may, for example, be less than 5.0/1000 carbon atoms, e.g., less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, is suitably higher than 0.50/1000 carbon atoms, suitably higher than 0.60/1000 carbon atoms. Such higher amount of double bonds is suitable e.g. if high cable production speed is desired and/or it would be desirable to minimise or to avoid sagging problems, and/or deformation, which may occur e.g. depending on the desired end application and/or the cable production process. Higher double bond content combined with "low" peroxide content of the invention is also suitable in cable embodiments, such as in DC power cables, where very demanding mechanical and/or heat resistance properties are needed for the layer, for example insulation layer, material.

Further, the polyolefin is, for example, unsaturated and contains at least vinyl groups and the total amount of vinyl groups is, for example, higher than 0.01/1000 carbon atoms, e.g., higher than 0.05/1000 carbon atoms, for example, higher than 0.08/1000 carbon atoms, and, e.g., higher than 0.11/1000 carbon atoms. Furthermore, the total amount of vinyl groups is, for example, lower than 4.0/1000 carbon atoms. The polyolefin, prior to crosslinking, contains vinyl groups in total amount of, for example, more than 0.20/1000 carbon atoms, e.g., more than 0.30/1000 carbon atoms, and, for example, more than 0.40/1000 carbon atoms. In some demanding embodiments, for example, in power cables, e.g., in DC power cables, at least one layer, for example an insulation layer, comprises LDPE polymer, e.g., LDPE copolymer, which contains vinyl groups in total amount of more than 0.50/1000 carbon atoms.

The unsaturation has shown to further contribute to said desirable balance of low conductivity and mechanical properties. In an embodiment of the present invention, the polyolefin of the Polymer composition is an unsaturated LDPE copolymer of ethylene with at least one polyunsaturated comonomer, e.g., a diene as defined above, and optionally with other comonomer(s), and has the total amount of carbon-carbon double bonds, which originate from vinyl groups, vinylidene groups and trans-vinylene groups, if present, as defined above, has, for example, the total amount of vinyl groups as defined above. Said unsaturated LDPE copolymer is highly usable for the method for further reducing the electrical conductivity of a crosslinked polymer composition, for example, of an insulation layer of a power cable, e.g., of a DC power cable.

Typically, and suitably in wire and cable (W&C) applications, the density of the polyolefin, for example, of the LDPE polymer, is higher than 860 kg/m³. The density of the polyolefin, e.g., of the LDPE polymer, the ethylene homo- or copolymer is, for example, not higher than 960 kg/m³, and is, e.g., from 900 to 945 kg/m³. The $MFR_2$ (2.16 kg, 190° C.) of the polyolefin, for example, of the LDPE polymer, e.g., from 0.01 to 1.7 g/10 min, for example, is from 0.1 to 1.7 g/10 min, and, e.g., is from 0.2 to 1.7 g/10 min.

Accordingly, the polyolefin of the invention is, for example, produced at high pressure by free radical initiated polymerisation (referred to as high pressure (HP) radical polymerisation). The HP reactor can be e.g. a well known tubular or autoclave reactor or a mixture of a tubular and an autoclave reactor. In an embodiment of the present invention the HP reactor is a tubular reactor. The polyolefin is, for example, unsaturated LDPE homopolymer or LDPE copolymer of ethylene with one or more comonomer(s), as defined above. The LDPE polymer obtainable by the process of the invention provides, e.g., the advantageous electrical properties as defined herein. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., for example, from 80 to 350° C. and pressure from 70 MPa, for example, 100 to 400 MPa, e.g., from 100 to 350 MPa. Pressure can be measured at least after compression stage and/or after the tubular reactor. Temperature can be measured at several points during all steps.

After the separation the obtained polymer is typically in a form of a polymer melt which is normally mixed and pelletised in a pelletising section, such as pelletising extruder, arranged in connection to the HP reactor system. Optionally, additive(s), such as sulphur containing antioxidant(s), can be added in this mixer in a known manner to result in the Polymer composition.

Further details of the production of ethylene (co)polymers by high pressure radical polymerisation can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Willing pp. 7181-7184.

When an unsaturated LDPE copolymer of ethylene is prepared, then, as well known, the C—C double bond content can be adjusted by polymerising the ethylene e.g. in the presence of one or more polyunsaturated comonomer(s), chain transfer agent(s), process conditions, or any combinations thereof, e.g. using the desired feed ratio between monomer, for example ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes.

Polymer Composition

Prior to crosslinking the polymer composition comprises at least one peroxide in the presence of a sulphur containing antioxidant, and wherein said polymer composition has a melt flow rate (MFR) of less than 1.7, and in the presence of less than 0.05 wt % 2,4-Diphenyl-4-methyl-1-pentene, wherein the "at least one" peroxide contains at least one —O—O— bond.

Naturally, in case where two or more different peroxide products are used in the polymer composition, then amount (in mmol) of —O—O—/kg polymer composition as defined above, below or in claims is the sum of the amount of —O—O—/kg polymer composition of each peroxide product. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy) hexane, 1,1-di(tert-butylperoxy)cyclohexane, 1,1-di(tert amylperoxy)cyclohexane, or any mixtures thereof, can be mentioned. Further, the peroxide is, for example, selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof. Furthermore, the peroxide is, e.g., dicumylperoxide.

Further, prior to crosslinking the polymer composition of the invention contains, in addition to the polyolefin and the peroxide, sulphur containing antioxidant(s).

Moreover, prior to crosslinking the polymer composition of the invention contains less than 0.05 wt % 2,4-Diphenyl-4-methyl-1-pentene.

Additionally, prior to crosslinking the polymer composition of the invention may contain, in addition to the polyolefin, The peroxide(s), the sulphur containing antioxidant(s) and less than 0.05 wt % 2,4-Diphenyl-4-methyl-1-pentene, further component(s) such as polymer component(s) and/or additive(s), exemplified additive(s), such as, stabiliser(s), processing aid(s), flame retardant additive(s), water tree retardant additive(s), acid or ion scavenger(s), inorganic filler(s) and voltage stabiliser(s), as known in the polymer field. The used amounts of additives are conventional and well known to a skilled person, e.g. as already described herein.

The Polymer composition of the invention comprises typically at least 50 wt %, for example, at least 60 wt %, e.g. at least 70 wt %, e.g., at least 75 wt %, for example, from 80 to 100 wt % and, for example, from 85 to 100 wt %, of the polyolefin based on the total weight of the polymer component(s) present in the Polymer composition. The exemplified Polymer composition consists of polyolefin as the only polymer component. The expression means that the Polymer composition does not contain further polymer components, but the polyolefin as the sole polymer component. However, it is to be understood herein that the Polymer composition may comprise further components other than polymer components, such as additives, in line with the additives as already described herein, which may optionally be added in a mixture with a carrier polymer, i.e. in so called master batch.

The Polymer composition suitably consist of the polyolefin, for example, polyethylene, e.g., LDPE homo or copolymer, which may optionally be unsaturated before crosslinking, as the sole polyolefin component.

End Uses and End Applications of the Invention

The new Polymer composition of the invention is highly useful in wide variety of end applications of polymers. Exemplified uses of the Polymer composition are in W&C applications, for example, in one or more layers of a power cable.

A power cable is defined to be a cable transferring energy operating at any voltage, typically operating at voltages higher than 1 kV. The voltage applied to the power cable can be alternating (AC), direct (DC), or transient (impulse). The polymer composition of the invention is very suitable for power cables operating at voltages higher than 320 kV, such cables cover high voltage (HV) and extra high voltage (EHV) power cables which EHV cables operate at even higher voltages, as well known in the field. The above terms have well known meanings and thus indicate the operating level of such cables. For HV DC and EHV DC power cables the operating voltage is defined herein as the electric voltage between ground and the conductor of the high voltage cable. Typically a HV DC power cable and EHV DC power cable operate at voltages of 40 kV or higher, even at voltages of 50 kV or higher. A power cable operating at very high voltages is known in the art as EHV DC power cable which in practice can be as high as, but not limited to, 900 kV.

The Polymer composition is highly suitable for use as a layer material for an AC or DC power cable, for example, for a direct current (DC) power cable, e.g., for a DC power cable operating at voltages at higher than 320 kV, such as well known HV DC or EHV DC power cable, as defined above.

A crosslinkable power cable, for example, a crosslinkable DC power cable, is provided comprising a conductor surrounded by one or more layers, for example, at least an insulation layer, e.g., at least an inner semiconductive layer, an insulation layer and an outer semiconductive layer, in that order, wherein at least one of said layer(s), for example, the insulation layer, comprises a polymer composition comprising a crosslinkable polyolefin, peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein.

The insulation layer of the power cable, for example, of the DC power cable, e.g., comprises said crosslinkable unsaturated LDPE copolymer as defined above.

The term "conductor" means herein above and below that the conductor comprises one or more wires. Moreover, the cable may comprise one or more such conductors. For example the conductor is an electrical conductor and comprises one or more metal wires.

As well known the cable can optionally comprise further layers, e.g. layers surrounding the insulation layer or, if present, the outer semiconductive layers, such as screen(s), a jacketing layer, other protective layer(s) or any combinations thereof.

The invention also provides a process for producing a power cable, for example, a crosslinkable power cable, e.g. a crosslinkable DC power cable, for example, a crosslinkable HV DC or EHV DC power cable, as defined above or in claims comprising a conductor surrounded by one or more layers, for example, at least an insulation layer, e.g., at least an inner semiconductive layer, an insulation layer and an outer semiconductive layer, in that order, wherein the process comprises the steps of applying one or more layers on a conductor wherein at least one layer, for example, the insulation layer, comprises a crosslinkable polymer composition of the invention comprising a polyolefin, peroxide, in an amount which corresponds to X mmol —O—O—/kg polymer composition, a sulphur containing antioxidant, in an amount which corresponds to Y mmol —OH/kg polymer composition, and wherein said polymer composition has a melt flow rate (MFR) of less than 1.7, and in the presence of less than 0.05 wt % 2,4-Diphenyl-4-methyl-1-pentene, wherein X and Y are as defined herein.

In an embodiment of the power cable production process of the invention a crosslinkable power cable is produced by (a) providing and mixing, for example, melt mixing in an extruder, said crosslinkable polymer composition of the invention as defined herein, (b) applying at least a melt mix of the polymer composition obtained from step (a), for example, by (co)extrusion, on a conductor to form one or more layers, e.g., at least an insulation layer, and (c) optionally crosslinking at least the polymer composition of the invention in said at least one layer, e.g., in the insulation layer.

For example, in this embodiment a crosslinkable DC power cable, e.g., a crosslinkable HV DC power cable, of the invention comprising a conductor surrounded by an inner semiconductive layer, an insulation layer, and an outer semiconductive layer, in that order, is produced, wherein the process comprises the steps of (a)

providing and mixing, for example, melt mixing in an extruder, a crosslinkable first semiconductive composition comprising a polymer, a carbon black and optionally further component(s) for the inner semiconductive layer, providing and mixing, for example, melt mixing in an extruder, a crosslinkable polymer composition of the invention for the insulation layer, providing and mixing, for example, melt mixing in an extruder, a second semiconductive composition which is, e.g., crosslinkable and comprises a polymer, a carbon black and optionally further component(s) for the outer semiconductive layer, (b) applying on a conductor, for example, by coextrusion, a melt mix of the first semiconductive composition obtained from step (a) to form the inner semiconductive layer, a melt mix of polymer composition of the invention obtained from step (a) to form the insulation layer, and a melt mix of the second semiconductive composition obtained from step (a) to form the outer semiconductive layer, and (c) optionally crosslinking at crosslinking conditions one or more of the polymer composition of the insulation layer, the semiconductive composition of the inner semiconductive layer and the semiconductive composition of the outer semiconductive layer, of the obtained cable, for example, at least the polymer composition of the insulation layer, e.g., the polymer composition of the insulation layer, the semiconductive composition of the inner semiconductive layer and the semiconductive composition of the outer semiconductive layer.

The polymer of the first and the second semiconductive composition is, for example, a polyolefin as described in relation to the polymer composition of the invention.

Further, the carbon black of the first and the second semiconductive composition may be any carbon black which is electrically conducting. The carbon black may, suitably, have one or more of the following properties: a) a primary particle size of at least 5 nm which is defined as the number average particle diameter according ASTM D3849-95a, b) iodine number of at least 30 mg/g according to ASTM D1510, c) oil absorption number of at least 30 ml/100 g which is measured according to ASTM D2414. Non limiting examples of suitable carbon blacks include furnace blacks and acetylene blacks.

One example of a group of furnace blacks has a primary particle size of 28 nm or less. The mean primary particle size is defined as the number average particle diameter measured according to ASTM D3849-95a. Furnace blacks of this category, may, for example, have an iodine number between 60 and 300 mg/g according to ASTM D1510. Further, the oil absorption number (of this category) may, for example, be between 50 and 225 ml/100 g, e.g. between 50 and 200 ml/100 g which may be measured according to ASTM D2414.

Another example of a group of furnace blacks has a primary particle size of greater than 28 nm. The mean primary particle size is defined as the number average particle diameter according to ASTM D3849-95a. Furnace blacks of this category may, for example, have an iodine number between 30 and 200 mg/g according to ASTM D1510. Furthermore, the oil absorption number (of this category) may, e.g., be between 80 and 300 ml/100 g measured according to ASTM D2414.

Other suitable carbon blacks can be made by any other process or can be further treated. Suitable carbon blacks for said first and second semiconductive composition may, for example, be characterized by their cleanliness. Therefore, a group of suitable carbon blacks thereof, may have an ash-content of less than 0.2 wt % measured according to ASTM D1506, a 325 mesh sieve residue of less than 30 ppm according to ASTM D1514 and have less than 1 wt % total sulphur according to ASTM D1619.

Furnace carbon black is a generally acknowledged term for the well known carbon black type that is produced in a furnace-type reactor. As examples of carbon blacks, the preparation process thereof and the reactors, reference is made to e.g. EP629222 of Cabot, U.S. Pat. Nos. 4,391,789, 3,922,335 and 3,401,020. As examples of commercial furnace carbon black grades described in ASTM D 1765-98b i.a. N351, N293 and N550, can be mentioned.

Furnace carbon blacks are conventionally distinguished from acetylene carbon blacks which are another suitable carbon black type which may be suitable for a semiconductive composition, Acetylene carbon blacks are produced in a acetylene black process by reaction of acetylene and unsaturated hydrocarbons, e.g. as described in U.S. Pat. No. 4,340,577. A group of suitable acetylene blacks may have a particle size of larger than 20 nm, e.g. 20 to 80 nm. The mean primary particle size is defined as the number average particle diameter according to the ASTM D3849-95a. Further, suitable acetylene blacks of this category have an iodine number between 30 to 300 mg/g, e.g. 30 to 150 mg/g according to ASTM D1510. Furthermore, the oil absorption number (of this category) may, for example, be between 80 to 300 ml/100 g, e.g. 100 to 280 ml/100 g and this is measured according to ASTM D2414. Acetylene black is a generally acknowledged term and are very well known and e.g. supplied by Denka.

Moreover said first and second semiconductive compositions may, for example, be identical.

Melt mixing means mixing above the melting point of at least the major polymer component(s) of the obtained mixture and is typically carried out in a temperature of at least 10-15° C. above the melting or softening point of polymer component(s).

The term "(co)-extrusion" means herein that in case of two or more layers, said layers can be extruded in separate steps, or at least two or all of said layers can be coextruded in a same extrusion step, as well known in the art. The term "(co)-extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polymer composition of the invention and the optional and exemplified first and second semiconductive compositions can be produced before or during the cable production process. Moreover the polymer composition of the invention and the optional and exemplified first and second semiconductive composition can each independently comprise part or all of the component(s) thereof before introducing to the (melt) mixing step a) of the cable production process.

The mixing step (a) of the provided polymer composition of the invention and of the exemplified first and second semiconductive compositions is, for example, carried out in a cable extruder. The step a) of the Cable production process may optionally comprise a separate mixing step, e.g. in a mixer arranged in connection and preceding the cable extruder of the Cable production line. Mixing in the preceding separate mixer can be carried out by mixing with or without external heating (heating with an external source) of the component(s). In case the peroxide(s), the sulphur containing antioxidant(s), less than 0.05 wt % 2,4-Diphenyl-4-methyl-1-pentene and part or all of the optional further component(s), such as further additive(s), of the polymer composition of the invention and of the optional and exemplified first and second semiconductive compositions, are added to the polyolefin during the Cable production process, then the addition(s) can take place at any stage during the mixing step (a), e.g. at the optional separate mixer preceding the cable extruder or at any point(s) of the cable extruder. The addition of peroxide(s), the sulphur containing antioxidant(s), less than 0.05 wt % 2,4-Diphenyl-4-methyl-1-pentene and optional additive(s) can be made simultaneously or separately as such, suitably in liquid form, or in a well known master batch, and at any stage during the mixing step (a).

In an embodiment of the invention, the peroxide(s), the sulphur containing antioxidant(s), less than 0.05 wt % 2,4-Diphenyl-4-methyl-1-pentene and, for example, also the optional further component(s), such as additive(s), are already present in at least the polymer composition, before it is used in the cable production process and in the production line thereof. The peroxide(s), the sulphur containing antioxidant(s) and less than 0.05 wt % 2,4-Diphenyl-4-methyl-1-pentene can be provided to the pellets of the polyolefin or of the polymer composition before the pellets are provided to the step (a) of the process. The peroxide(s), the sulphur containing antioxidant(s) and less than 0.05 wt % 2,4-Diphenyl-4-methyl-1-pentene can be e.g. melt mixed together with the polyolefin and optional further component(s) and then the melt mix is pelletised, or, for example, can be added, e.g., impregnated, to the solid pellets of the polyolefin or of the polymer composition. The peroxide(s), the sulphur containing antioxidant(s) and less than 0.05 wt % 2,4-Diphenyl-4-methyl-1-pentene are, for example, added in liquid state, i.e. they can be in liquid form at ambient temperature, or are preheated above the melting or glass transition point thereof or dissolved in a carrier medium, as well known to a skilled person. The addition of the optional additive(s) in this embodiment can be made as described above for the peroxide(s), the sulphur containing antioxidant(s) and less than 0.05 wt % 2,4-Diphenyl-4-methyl-1-pentene.

The Polymer composition and the optional first and second semiconductive composition may, for example, be used in form of powder, grain or pellets when provided to the cable production process. Pellets can be of any size and shape.

Further, the melt mix of the Polymer composition may, for example, be obtained from melt mixing step consists of the polyolefin of the invention as the sole polymer component. The optional, and exemplified, additive(s) can be added to Polymer composition as such or as a mixture with a carrier polymer, i.e. in a form of so-called master batch.

In an embodiment of the cable production process, a crosslinkable power cable, e.g., a crosslinkable DC power cable, for example, a crosslinkable HV DC power cable, is produced, wherein the insulation layer comprises the polymer composition of the invention comprising a crosslinkable polyolefin, optionally, and, e.g., unsaturated an LDPE homo or copolymer, and peroxide(s), sulphur containing antioxidant(s) and less than 0.05 wt % 2,4-Diphenyl-4-methyl-1-pentene, in amounts as given herein, and then the crosslinkable polyolefin in the insulation layer of the obtained cable is crosslinked in step c) in crosslinking conditions. For example, in this embodiment, a crosslinked power cable, for example, a crosslinked DC power cable, e.g., a crosslinked HV DC power cable, is produced, which comprises a conductor surrounded by an inner semiconductive layer comprising, for example, consisting of, a first semiconductive composition, an insulation layer comprising, for example, consisting of, a polymer composition of the invention as defined above, and optionally, and e.g., an outer semiconductive layer comprising, for example, consisting of, a second semiconductive composition, wherein at least the polymer composition of the insulation layer, optionally and, e.g., at least one, for example, both, of the first and the second semiconductive composition the inner and, respectively, outer semiconductive layer, is crosslinked at crosslinking conditions in step (c). Crosslinking of the polymer composition of the insulation layer is carried out in the presence of a peroxide in an amount as defined above or in below claims, and the optional crosslinking of the first semiconductive composition of the inner semiconductive, is carried out in the presence of crosslinking agent(s), for example, in the presence of free radical generating agent(s), which is, e.g., a peroxide(s).

The crosslinking agent(s) can already be present in the optional first and second semiconductive composition before introducing to the crosslinking step c) or introduced during the crosslinking step. Peroxide is, for example, used as the crosslinking agent for said optional first and second semiconductive compositions and is, e.g., included to the pellets of semiconductive composition before the composition is used in the cable production process as described above.

Crosslinking can be carried out at temperatures, as already described herein, i.e. the maximum temperature of said polymer composition under the curing procedure during which procedure the polymer composition is crosslinked.

The processing temperatures and devices are well known in the art, e.g. conventional mixers and extruders, such as single or twin screw extruders, are suitable for the process of the invention.

The invention further provides a crosslinked power cable, for example, a crosslinked DC power cable, e.g., a crosslinked HV DC or EHV DC power cable, comprising a conductor surrounded by one or more layers, e.g., at least by an insulation layer, e.g., at least by an inner semiconductive layer, insulation layer and an outer semiconductive layer, in that order, wherein at least the insulation layer comprises the crosslinked polymer composition or any of the subgroups or embodiments thereof as defined above or in claims. Optionally also one or both, for example, both, of the inner semiconductive composition and the outer semiconductive composition are crosslinked.

Naturally, the polymer composition of the invention used in at least one cable layer, for example, in an insulation layer, of the cable of the invention has, when crosslinked, the advantageous properties as defined herein.

The invention further provides the use of the Polymer composition, or any of the exemplified subgroups or embodiments thereof, as defined above or in claims, in at least one layer, for example, in at least an insulation layer, of a crosslinked power cable, e.g., of a crosslinked (DC) power cable, for example, of a crosslinked HV DC or EHV DC power cable, comprising a conductor surrounded by at least one layer, e.g., at least an inner semiconductive layer, insulation layer and an outer semiconductive layer, in that order.

The invention provides also the use of the Polymer composition, or any of the exemplified subgroups or embodiments thereof, as defined above or in claims, for producing at least one layer, for example, at least an insulation layer, of a crosslinked power cable, e.g. of a crosslinked (DC) power cable, for example, of a crosslinked HV DC or EHV DC power cable, comprising a conductor surrounded by at least one layer, e.g., at least an inner semiconductive layer, insulation layer and an outer semiconductive layer, in that order.

The thickness of the insulation layer of the power cable, for example, of the DC cable, e.g., of the HV DC or EHV DC power cable, is typically 2 mm or more, for example, at least 3 mm, e.g., of at least 5 to 100 mm, for example, from 5 to 50 mm, when measured from a cross section of the insulation layer of the cable.

Determination Methods

Unless otherwise stated in the description or experimental part the following methods were used for the property determinations.

wt %: % by weight

Oxidation Induction Time (OIT) Method

The OIT test is performed according to ASTM-D3895, ISO/CD 11357 and EN 728 using a Differential Scanning calorimeter (DSC). A circular sample with a diameter of 5 mm and a weight of 5-6 mg of the material (i.e. the crosslinked polymer composition of the present invention) to be tested is introduced into the DSC at room temperature, and the sample is heated to 200° C. (20° C./min) in nitrogen atmosphere. After 5 min stabilisation isothermally at 200° C., the gas is changed from nitrogen to oxygen. The flow rate of oxygen is the same as nitrogen, 50 ml/min. Under these conditions the stabiliser is consumed over time until it is totally depleted. At this point the polymer sample (i.e. the crosslinked polymer composition of the present invention) degrades or oxidizes liberating additional heat (exothermal reaction).

The Oxidation Induction Time (OIT) is defined as the time measured from the oxygen switch on to the onset inflection point for the exothermal reaction occurring when the stabiliser is depleted. Thus OIT is a measure of the thermal stability of the material. Parallel measurements are performed for each condition and mean value is calculated.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$).

Density

The density was measured according to ISO 1183-2. The sample preparation was executed according to ISO 1872-2 Table 3 Q (compression moulding).

Comonomer Contents a) Quantification of Alpha-Olefin Content in Linear Low Density Polyethylenes and Low Density Polyethylenes by NMR Spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989)). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140° C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125° C., a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

b) Comonomer Content of Polar Comonomers in Low Density Polyethylene (1) Polymers Containing >6 wt % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 $cm^{-1}$ was divided with the peak height of polyethylene at 2020 $cm^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 $cm^{-1}$ was subtracted with the absorbance value for the base line at 2475 $cm^{-1}$ ($A_{methylacrylate}-A_{2475}$). Then the maximum absorbance peak for the polyethylene peak at 2660 $cm^{-1}$ was subtracted with the absorbance value for the base line at 2475 $cm^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt % or Less Polar Comonomer Units

Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 $cm^{-1}$ and butylacrylate at 1165 $cm^{-1}$) was subtracted with the absorbance value for the base line at 1850 $cm^{-1}$ ($A_{polar\ comonomer}-A_{1850}$). Then the maximum absorbance peak for polyethylene peak at 2660 $cm^{-1}$ was subtracted with the absorbance value for the base line at 1850 $cm^{-1}$ ($A_{2660}-A_{1850}$). The ratio between ($A_{comonomer}-A_{1850}$) and ($A_{2660}-A_{1850}$) was then calculated. The NMR spectroscopy calibration procedure was undertaken in the conventional manner which is well documented in the literature, as described above under method 1).

The weight-% can be converted to mol-% by calculation, and how to do this is well documented in the literature.

PENT (Pennsylvania Notch Test) The resistance to slow crack growth was assessed using the Pennsylvania Notch Test (PENT) according to ISO 16241:2005 with some modifications.

A compression moulded plaque of each material was produced according to the following procedure. Granules were heated in a closed mould at 180° C. for 15 minutes without pressure. The heat was turned off and a nominal pressure of 1.7 MPa was applied for 12.5 hours while the sample and mould were left to cool down naturally.

Dimensions of test piece: 60 mm×25 mm×10 mm

Principal notch: 3.5 mm deep

Side notches: 0.7 mm deep

Test temperature of test pieces: 70° C.

Test stress (calculated on the un-notched cross-sectional area): 2.0 MPa 2 test pieces per material The time to failure was recorded, and the average from 2 test pieces calculated.

Crystallinity and melting temperature was measured with DSC using a TA Instruments Q2000. The temperature program used was starting at 30° C., heating to 180° C., an isotherm at 180° C. for 2 min and then cooling to −15° C., an isotherm at −15° C. for 2 min and then heating to 180° C. The heating and cooling rates are 10° C./min.

Samples which are crosslinked were all crosslinked at 180° C. for 10 min and then degassed in vacuum at 70° C. over night to remove all peroxide by-products before the crystallinity and melt temperature was measured.

Melting temperature, $T_m$, is the temperature where the heat flow to the sample is at its maximum.

The degree of crystallinity, Crystallinity %, =100×ΔHf/ ΔH 100% where ΔH100% (J/g) is 290.0 for PE (L. Mandelkem, Macromolecular Physics, Vol. 1-3, Academic Press, New York 1973, 1976 &1980) The evaluation of crystallinity was done from 20° C.

DC Conductivity Method

The plaques are compression moulded from pellets of the test polymer composition. The final plaques consist of the test polymer composition and have a thickness of 1 mm and a diameter of 260 mm.

The final plaques are prepared by press-moulding at 130° C. for 600 s and 20 MPa. Thereafter the temperature is increased and reaches 180° C. or 250° C. after 5 min. The temperature is then kept constant at 180° C. or 250° C. for 1000 s during which the plaque becomes fully crosslinked by means of the peroxide present in the test polymer composition. Finally the temperature is decreased using the cooling rate 15° C./min until room temperature is reached when the pressure is released.

A high voltage source is connected to the upper electrode, to apply voltage over the test sample. The resulting current through the sample is measured with an electrometer/picoammeter. The measurement cell is a three electrodes system with brass electrodes placed in an heating oven circulated with dried compressed air to maintain a constant humidity level.

The diameter of the measurement electrode is 100 mm. Precautions have been made to avoid flashovers from the round edges of the electrodes.

The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the insulation.

This method and a schematic picture of the measurement setup for the conductivity measurements has been thoroughly described in publications presented at Nordic Insulation Symposium 2009 (Nord-IS 09), Gothenburg, Sweden, June 15-17, 2009, page 55-58: Olsson et al, "Experimental determination of DC conductivity for XLPE insulation".

Nordic Insulation Symposium 2013 (Nord-IS 13), Trondheim, Norway, June 9-12, 2013, page 161-164: Andersson et al, "Comparison of test setups for high field conductivity of HVDC insulation materials".

Method for Determination of the Amount of Double Bonds in the Polymer Composition or in the Polymer A) Quantification of the Amount of Carbon-Carbon Double Bonds by IR Spectroscopy Quantitative infrared (IR) spectroscopy was used to quantify the amount of carbon-carbon doubles (C=C) bonds. Calibration was achieved by prior determination of the molar extinction coefficient of the C=C functional groups in representative low molecular weight model compounds of known structure.

The amount of each of these groups (N) was defined as number of carbon-carbon double bonds per thousand total carbon atoms (C=C/1000 C) via:

$$N=(A\times 14)/(E\times L\times D)$$

where A is the maximum absorbance defined as peak height, E the molar extinction coefficient of the group in question ($l\cdot mol^{-1}\cdot mm^{-1}$), L the film thickness (mm) and D the density of the material ($g\cdot cm^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 $cm^{-1}$ and analysed in absorption mode.

All quantification was undertaken using the absorption of the C=C—H out-of-plain bend between 910 and 960 cm-1. The specific wave number of the absorption was dependant on the chemical structure of the unsaturation containing species.

1) Polymer Compositions Comprising Polyethylene Homopolymers and Copolymers, Except Polyethylene Copolymers with >0.4 wt % Polar Comonomer For polyethylenes three types of C=C containing functional groups were quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $l\cdot mol^{-1}\cdot mm^{-1}$ vinylidene (RR'C=CH2) via 888 $cm^{-1}$ based on 2-methyl-1-heptene [2-methyhept-1-ene] giving E=18.24 $l\cdot mol^{-1}\cdot mm^{-1}$ trans-vinylene (R—CH=CH—R') via 965 $cm^{-1}$ based on trans-4-decene [(E)-dec-4-ene] giving E=15.14 $l\cdot mol^{-1}\cdot mm^{-1}$ For polyethylene homopolymers or copolymers with <0.4 wt % of polar comonomer linear baseline correction was applied between approximately 980 and 840 $cm^{-1}$.

2) Polymer Compositions Comprising Polyethylene Copolymers with >0.4 wt % Polar Comonomer For polyethylene copolymers with >0.4 wt % of polar comonomer two types of C=C containing functional groups were quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $l\cdot mol^{-1}\cdot mm^{-1}$ vinylidene (RR'C=CH2) via 888 $cm^{-1}$ based on 2-methyl-1-heptene [2-methyhept-1-ene] giving E=18.24 $l\cdot mol^{-1}\cdot mm^{-1}$

EBA:

For poly(ethylene-co-butylacrylate) (EBA) systems linear baseline correction was applied between approximately 920 and 870 $cm^{-1}$.

EMA:

For poly(ethylene-co-methylacrylate) (EMA) systems linear baseline correction was applied between approximately 930 and 870 $cm^{-1}$.

3) Polymer Compositions Comprising Unsaturated Low Molecular Weight Molecules

For systems containing low molecular weight C=C containing species direct calibration using the molar extinction coefficient of the C=C absorption in the low molecular weight species itself was undertaken.

B) Quantification of Molar Extinction Coefficients by IR Spectroscopy

The molar extinction coefficient was determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 $cm^{-1}$.

The molar extinction coefficient (E) was determined as $l\cdot mol^{-1}\cdot mm^{-1}$ via:

$$E=A/(C\times L)$$

were A is the maximum absorbance defined as peak height, C the concentration ($mol\cdot l^{-1}$) and L the cell thickness (mm).

At least three 0.18 mol·l$^{-1}$ solutions in carbondisulphide (CS$_2$) were used and the mean value of the molar extinction coefficient determined. For a,w-divinylsiloxanes the molar extinction coefficient was assumed to be comparable to that of <insert small molecule here>.

Alternative Description of the Method for Determination of the Amount of Double Bonds in the Polymer Composition or in the Polymer Quantification of the Amount of Carbon-Carbon Double Bonds by IR Spectroscopy Quantitative infrared (IR) spectroscopy was used to quantify the amount of carbon-carbon double bonds (C═C). Specifically solid-state transmission FTIR spectroscopy was used (Perkin Elmer 2000). Calibration was achieved by prior determination of the molar extinction coefficient of the C═C functional groups in representative low molecular weight model compounds of know structure.

The amount of a given C═C functional group containing species (N) was defined as number of carbon-carbon double bonds per thousand total carbon atoms (C═C/1000 C) according to:

$$N=(A\times 14)/(E\times L\times D)$$

were A is the maximum absorbance defined as peak height, E the molar extinction coefficient of the group in question (l·mol$^{-1}$·mm$^{-1}$), L the film thickness (mm) and D the density of the material (g·cm$^1$).

For systems containing unsaturation three types of C═C containing functional groups were considered, each with a characteristic C═C—H out-of-plain bending vibrational mode, and each calibrated to a different model compound resulting in individual extinction coefficients:

vinyl (R—CH═CH2) via at around 910 cm-1
    based on 1-decene [dec-1-ene] giving E=13.13 l·mol-l·mm-1 vinylidene (RR'C═CH2) at around 888 cm-1
    based on 2-methyl-1-heptene [2-methyhept-1-ene] giving E=18.24 l·mol-l·mm-1 trans-vinylene (R—CH═CH—R') at around 965 cm-1
    based on trans-4-decene [(E)-dec-4-ene] giving E=15.14 l·mol-l·mm-1

The specific wavenumber of this absorption was dependant on the specific chemical structure of the species. When non-aliphatic unsaturated group were addressed the molar extinction coefficient was taken to be the same as that of their related aliphatic unsaturated group, as determined using the aliphatic small molecule analogue.

The molar extinction coefficient was determined according to the procedure given in ASTM D3124-98 and ASTM D6248-98. Solution-state infrared spectra were recorded on standard solutions using a FTIR spectrometer (Perkin Elmer 2000) equipped with a 0.1 mm path length liquid cell at a resolution of 4 cm$^{-1}$. The molar extinction coefficient (E) was determined as l·mol$^{-1}$·mm$^{-1}$ via:

$$E=A/(C\times L)$$

were A is the maximum absorbance defined as peak height, C the concentration (mol·l$^{-1}$) and L the cell thickness (mm). At least three 0.18 mol·l$^{-1}$ solutions in carbondisulphide (CS$_2$) were used and the mean value of the molar extinction coefficient determined.

Experimental Part

Preparation of Polymers of the Examples of the Present Invention and the Comparative Example All polymers were low density polyethylenes produced in a high pressure reactor. As to CTA feeds, e.g. the PA content can be given as liter/hour or kg/h and converted to either units using a density of PA of 0.807 kg/liter for the recalculation.

LDPE1:

Ethylene with recycled CTA was compressed in a 5-stage precompressor and a 2-stage hyper compressor with intermediate cooling to reach initial reaction pressure of ca 2628 bar. The total compressor throughput was ca 30 tons/hour. In the compressor area approximately 4.9 litres/hour of propion aldehyde (PA, CAS number: 123-38-6) was added together with approximately 81 kg propylene/hour as chain transfer agents to maintain an MFR of 1.89 g/10 min. Here also 1,7-octadiene was added to the reactor in amount of 27 kg/h. The compressed mixture was heated to 157° C. in a preheating section of a front feed two-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 275° C. after which it was cooled to approximately 200° C. The subsequent 2nd peak reaction temperature was 264° C. The reaction mixture was depressurised by a kick valve, cooled and polymer was separated from unreacted gas.

LDPE3 (an LDPE3 Polymer May be Prepared as Described Below):

Ethylene with recycled CTA was compressed in a 5-stage precompressor and a 2-stage hypercompressor with intermediate cooling to reach initial reaction pressure of ca 2781 bar. The total compressor throughput was ca 30 tons/h. In the compressor area approximately 5.3 litres/hour of propionaldehyde (PA, CAS number 123-38-6) was added together with approximately 83 kg propylene/hour as chain transfer agents to maintain an MFR of 0.72 g/10 min. The compressed mixture was heated to 171° C. in the preheating section of the front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 283° C. after which it was cooled to approximately 203° C. The subsequent $2^{nd}$ and $3^{rd}$ peak reaction temperatures were 275° C. and 265° C. respectively with a cooling in between to 223° C. The reaction mixture was depressurised by a kick valve, cooled and polymer was separated from unreacted gas.

The components of the crosslinked polymer compositions of inventive examples (INV.Ex.) 1 to 2, reference example (Ref. Ex.) 1 to 2 (represents the prior art polymer composition crosslinked with a conventional amount of peroxide) and the properties and experimental results of the compositions are given in table 1. The used additives are commercially available:

Peroxide: DCP=dicumyl peroxide ((CAS no. 80-43-3)

Sulphur containing antioxidants: 4,4'-thiobis (2-tertbutyl-5-methylphenol) (CAS number: 96-69-5).

Additive: 2,4-Diphenyl-4-methyl-1-pentene (CAS-no. 6362-80-7).

The amount of DCP is given in mmol of the content of —O—O— functional group per kg polymer composition. The amounts are also given in brackets as weight % (wt %).

TABLE 1

The properties of the compositions of the inventive and reference examples:

| POLYMER COMPOSITION: | Ref. Ex. 1 | Ref. Ex. 2 | Inv. Ex. 1 | Inv. Ex. 2 |
|---|---|---|---|---|
| Polyolefin | LDPE1 | LDPE1 | LDPE3 | LDPE3 |
| MFR | ~2 | ~2 | 0.7 | 0.7 |
| DCP (wt %) | 0.55 | 0.55 | 0.70 | 0.90 |
| mmol of —O—O—/kg polymer composition | 20 | 20 | 25.9 | 33.3 |
| 4,4'-thiobis (2-tertbutyl-5-methylphenol) (antioxidant) (wt %) | 0.08 | 0.08 | 0.08 | 0.08 |
| mmol of phenolic —OH/kg polymer composition | 4.5 | 4.5 | 4.5 | 4.5 |
| 2,4-Diphenyl-4-methyl-1-pentene (wt %) | 0.05 | 0.10 | 0 | 0 |
| Oxidation Induction Time (OIT), [minutes], Cross-linking temp 180° C. | 22 | 33 | 5 | 5 |
| OIT, [minutes], Cross-linking temp 250° C. | 41 | 50 | 6 | 6 |
| Conductivity at 30 kV/mm and 70° C. (Not degassed) [fS/m], Cross-linking temp 180° C. | 24 | 27 | 9.2 | 10.5 |
| Conductivity at 30 kV/mm and 70° C. (Not degassed) [fS/m], Cross-linking temp 250° C. | 41 | 45 | 16 | 18.8 |
| Peroxide by-products [ppm] | 5500 | 5500 | 7000 | 9000 | wt %-values given in table 1 based on the total amount of the polymer composition.

TABLE 2

Properties of the polyolefin components

| Base Resin Properties | LDPE1 | LDPE3 |
|---|---|---|
| MFR 2.16 kg, at 190° C. [g/10 min] | 1.89 | 0.72/0.73 |
| Density [kg/m$^3$] | 923 | 922.0/922.5 |
| Vinyl [C=C/1000 C] | 0.54 | 0.27/0.27 |
| Vinylidene [C=C/1000 C] | 0.16 | 0.17/0.16 |
| Trans-vinylene [C=C/1000 C] | 0.06 | 0.04/0.04 |
| Crystallinity [%] | 48.8 | 48.7/53.9 |
| Melting point, T$_m$ [° C.] | 110.2 | 110.0/109.8 |

Table 1 shows that the electrical conductivity of the inventive crosslinked polymer compositions (INV.Ex. 1-2) are markedly reduced compared to the reference examples (Ref. Ex. 1-2).

The mechanical properties, e.g. expressed as PENT, of INV.Ex. 1-2 were expected to be comparable to the mechanical properties of the Ref. Ex. 1-2, but no PENT data is disclosed here. Further, it has been shown in, for example, EP2499172, which is included here by reference, that sufficient PENT properties are achieved comparable polymer compositions with about 0.5 (wt %) DCP.

The invention claimed is:

1. A crosslinkable polymer composition comprising:
a polyolefin, a peroxide, and a phenolic sulfur containing antioxidant;
wherein said peroxide is present in an amount which corresponds to X mmol —O—O—/kg polymer composition;
wherein said phenolic sulfur containing antioxidant is present in an amount which corresponds to Y mmol —OH/kg polymer composition;
wherein 2.0≤Y≤8.0, X<35, and 0.9*Y+3.0≤X≤65−4.7*Y;
wherein said polyolefin is:
a low density polyethylene (LDPE) homopolymer having a total amount of carbon-carbon double bonds, which originate from vinyl groups, vinylidene groups, trans-vinylene groups, or a combination thereof, of more than 0.3/1000 carbon atoms; or
an unsaturated LDPE copolymer of ethylene and with at least one polyunsaturated comonomer, the unsaturated LDPE copolymer having a total amount of carbon-carbon double bonds, which originate from vinyl groups, vinylidene groups, trans-vinylene groups, or a combination thereof, of more than more than 0.3/1000 carbon atoms;
wherein said polyolefin has a melt flow rate, MFR$_2$, determined according to ISO1133, of less than 1.7 g/10 min;
wherein said crosslinkable polymer composition comprises 0% by weight (wt %) 2,4-diphenyl-4-methyl-1-pentene; and
when crosslinked to form a crosslinked polymer composition, the crosslinked polymer composition has:
an electrical conductivity of from 1 to 35 fS/m, when measured according to DC conductivity method as described under "Determination Methods", and an Oxidation Induction Time of from 1 to 14 minutes as determined according to ASTM-D3895, ISO/CD 11357 and EN 728 using a Differential Scanning Calorimeter (DSC).

2. The crosslinkable polymer composition according to claim 1, wherein 2.0≤Y≤6.5.

3. The crosslinkable polymer composition according to claim 1, wherein the polyolefin is a low density polyethylene (LDPE) homopolymer having a total amount of carbon-carbon double bonds, which originate from vinyl groups, vinylidene groups, trans-vinylene groups, or a combination thereof, of more than more than 0.3/1000 carbon atoms.

4. The crosslinkable polymer composition according to claim 1, wherein the polyolefin is an unsaturated LDPE copolymer of ethylene with at least one polyunsaturated comonomer and optionally with one or more other comonomer(s), wherein the polyunsaturated comonomer comprises a straight carbon chain with at least 8 carbon atoms and at least 4 carbons between the non-conjugated double bonds, of which at least one is terminal.

5. A crosslinked polymer composition obtained by crosslinking the crosslinkable polymer composition of claim 1.

6. A crosslinked polymer composition formed by exposing the crosslinkable polymer composition of claim 1 to a curing procedure, wherein said crosslinkable polymer composition is crosslinked during said curing procedure.

7. The crosslinked polymer composition according to claim 6, wherein during said curing procedure the maximum temperature of said crosslinkable polymer composition is above 150° C.

8. A power cable insulation comprising the crosslinked polymer composition according to claim 5.

9. The power cable insulation according to claim 8, wherein the power cable insulation is an HV DC power cable insulation or an EHV DC power cable insulation.

10. A power cable comprising the power cable insulation of claim 8.

11. The power cable according to claim 10, wherein the power cable is an HV DC power cable or an EHV DC power cable.

12. A method for providing a crosslinked polymer composition with low electrical conductivity, the method comprising crosslinking the crosslinkable polymer composition of claim 1.

13. A method of making a power cable insulation, the method comprising the steps of:
providing at least a polymer-based electrical insulator comprising at least one crosslinkable polymer composition according to claim 1, wherein the polymer-based electrical insulator surrounds an electrical conductor of a power cable; and
exposing the polymer-based electrical insulator to a curing procedure, wherein the crosslinkable polymer composition is crosslinked during the curing procedure, and wherein during the curing procedure the maximum temperature of the polymer-based electrical insulator is above 150° C.

14. A crosslinked power cable comprising a conductor surrounded by at least an inner semiconductive layer, an insulation layer and an outer semiconductive layer, in that order, wherein at least the insulation layer comprises the crosslinked polymer composition of claim 5, and optionally surrounded by one or more further layer(s) selected from a group comprising screen(s), a jacketing layer(s) or other protective layer(s).

15. The crosslinkable polymer composition according to claim 1, wherein the polyolefin is an unsaturated LDPE copolymer of ethylene with at least one polyunsaturated comonomer and optionally with one or more other comonomer(s), wherein the polyunsaturated comonomer is a diene selected from 1,7-octadiene, 1,9-decadiene, 1,11-dodecadiene, 1,13-tetradecadiene, 7-methyl-1,6-octadiene, 9-methyl-1,8-decadiene, or mixtures thereof.

* * * * *